United States Patent
Haug et al.

(10) Patent No.: US 6,298,957 B1
(45) Date of Patent: Oct. 9, 2001

(54) PROCESS FOR PRODUCING A COMPONENT AND A COMPONENT PRODUCED THEREBY HAVING PARTICULAR USE IN VEHICLE DISC BRAKES

(75) Inventors: Tilmann Haug, Uhldingen-Muehlheim; Steffen Rauscher, Ulm; Michael Scheydecker, Nersingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/511,075

(22) Filed: Feb. 23, 2000

Related U.S. Application Data

(62) Division of application No. 09/039,492, filed on Mar. 16, 1998.

(30) Foreign Application Priority Data

Mar. 14, 1997 (DE) ............... 197 10 671

(51) Int. Cl.$^7$ .................................... F16D 69/00
(52) U.S. Cl. ................... 188/251 R; 188/251 M
(58) Field of Search ............ 188/251 R, 251 M, 188/251 A; 428/325, 328, 331, 469, 698, 704; 427/376.3

(56) References Cited

U.S. PATENT DOCUMENTS

| | | | |
|---|---|---|---|
| 3,509,973 | * 5/1970 | Kimata | 188/218 A |
| 4,585,618 | * 4/1986 | Fresnel et al. | 419/12 |
| 4,646,811 | * 3/1987 | Morishita et al. | 164/103 |
| 5,254,383 | * 10/1993 | Harpell et al. | 428/68 |
| 5,269,989 | * 12/1993 | Pyzik | 264/60 |
| 5,394,929 | * 3/1995 | Pyzik et al. | 164/97 |
| 5,511,603 | * 4/1996 | Brown et al. | 164/97 |
| 5,524,967 | 6/1996 | Cook. | |
| 5,878,849 | * 3/1999 | Prunier, Jr. et al. | 188/251 M X |
| 5,957,251 | * 9/1999 | Jones et al. | 188/251 R |
| 6,051,277 | * 4/2000 | Claussen et al. | 427/376.3 |

FOREIGN PATENT DOCUMENTS

| | | |
|---|---|---|
| 41 12 693 A1 | 11/1991 | (DE). |
| 42 12 558 A1 | 10/1992 | (DE). |
| 41 15 057 A1 | 11/1992 | (DE). |
| 43 22 113 A1 | 12/1994 | (DE). |
| 59-227781 * | 12/1984 | (JP) ............ 164/98 |
| 60-70139 * | 4/1985 | (JP) ............ 164/103 |
| 60-203353 * | 10/1985 | (JP) ............ 164/98 |
| 61-48541 * | 3/1986 | (JP) ............ 164/103 |
| 3-114650 * | 5/1991 | (JP) ............ 164/103 |
| WO 93/03193 | 2/1993 | (WO). |
| WO 96/41030 | 12/1996 | (WO). |

* cited by examiner

Primary Examiner—Douglas C. Butler
Assistant Examiner—Melanie Torres
(74) Attorney, Agent, or Firm—Crowell & Moring LLP

(57) ABSTRACT

A component is made, in regions, of a ceramic-metal composite material. A porous sacrificial body produced from ceramic precursors is filled with softened metal and/or a metallic alloy at a predeterminable filling temperature at or above the softening temperature of the filling metal and under superatmospheric pressure. The filled sacrificial body is heated to or above a reaction temperature which is higher than the filling temperature, where a reaction between the filling metal (FMe) and the metal of the ceramic of the sacrificial body (CMe) is carried out, forming the ceramic-metal composite material comprising a ceramic phase and a metallic phase. The ceramic phase comprises $CMe_mB_x$ and/or $CMe_nC_y$ and/or $CMe_oCN$ and $FMe_pO_3$, and the metallic phase comprises an intermetallic compound of a metal of the ceramic (CMe) and a filling metal (FMe). The sacrificial body is filled with the filling metal (FMe) during pressure casting of the component. A shape at least close to the final shape of the component, comprising a filled sacrificial body and the intermediate element(s) free of the sacrificial body, is cast by the pressure casting tool, and the component after casting is complete is heated to or above the reaction temperature in the region of the sacrificial body.

11 Claims, 2 Drawing Sheets

PROCESS FOR PRODUCING A COMPONENT AND A COMPONENT PRODUCED THEREBY HAVING PARTICULAR USE IN VEHICLE DISC BRAKES

This application is a division of application Ser. No. 09/039,492, filed Mar. 16, 1998.

BACKGROUND AND SUMMARY OF THE INVENTION

This application claims the priority of German application 197 10 671.4, filed Mar. 14, 1997, the disclosure of which is expressly incorporated by reference herein.

The present invention relates to a process for producing a component which is made, in regions, of a ceramic-metal composite material, in which process a porous sacrificial body is produced from ceramic precursors, the sacrificial body is filled with softened metal and/or a metallic alloy (hereinafter referred to as filling metal) at a predeterminable filling temperature at or above the softening temperature of the metal and under super-atmospheric pressure. The sacrificial body filled with the metal is heated to or above a reaction temperature which is higher than the filling temperature, and a reaction between the filling metal and the metal of the ceramic of the sacrificial body is carried out at or above the reaction temperature. In this reaction, the ceramic-metal composite material comprising a ceramic phase and a metallic phase is formed, where the ceramic phase comprises $CMe_mB_x$ and/or $CMe_nC_y$ and/or $CMe_oCN$ and $FMe_pO_3$ and the metallic phase comprises an intermetallic compound of a metal of the ceramic and a filling metal.

The present invention also relates to a component which, at least in regions, comprises the ceramic-metal composite material formed in the foregoing process.

A German patent application, which is not a prior publication, discloses a process for producing a component comprising a ceramic-metal composite material. A sacrificial body of ceramic precursors is filled with a thermally softened metal, in particular aluminum, and/or with a metallic alloy. The filling temperature is below a reaction temperature at which an exchange reaction between a metal of the ceramic precursors and a metal of the filling metal takes place. After the sacrificial body has been filled as completely as possible, the filled sacrificial body is heated to or above the reaction temperature, as a result of which the reaction just mentioned then takes place. This reaction produces a component in which the ceramic-metal composite material comprises a ceramic phase and a metallic phase comprises an intermetallic compound of the metal of the ceramic and the metal of the filling metal.

As a result of the sacrificial body being filled with a metal softened by heating below a reaction temperature of the metal with the material of the sacrificial body, the ceramic matrix is retained during filling and also during the subsequent reaction between the introduced metal and the material of the sacrificial body. Ideally, the pores of the sacrificial body are completely filled, so that when the substances in question are used in stoichiometric amounts, the component has reacted fully throughout and is free of cracks and channels.

Preferably, the filling metal is aluminum and the metal of the ceramic is titanium, so that after the preferred exchange reaction the ceramic phase comprises $TiB_x$ and/or $TiC_y$ and/or $TiCN$ and $Al_2O_3$ and the intermetallic compound of the metallic phase is the high-temperature-resistant TiAl.

The material properties of this ceramic-metal composite material are good. Thus, for example, a ceramic-metal composite material which is produced using aluminum as filling metal (FMe) and Ti as metal of the ceramic sacrificial body (CMe) has a density of 3.4 $g/cm^3$; this density is slightly higher than that of the MMCs (metal matrix composites) but is only 42% of the density of comparable cast iron. Particularly in the preferred embodiment, in which the high-temperature-resistant compound is in the form of the intermetallic compound TiAl, the use range of the component extends to at least 800° C., significantly above the values for grey cast iron.

The ceramic-metal composite material produced is used, in particular, to manufacture friction rings for the frictional surfaces of disc brakes. These friction rings are subsequently fixed by mechanical joining techniques such as screws, etc., to the hub of the brake disc.

It is an object of the present invention to further improve the foregoing process so that components comprising a previously known ceramic-metal composite material can be produced more simply, more quickly and, in particular, more cheaply.

This object has been achieved in a process according to the present invention by providing that the sacrificial body is laid into a pressure casting tool in a defined position and fixed in position relative to the pressure casting tool and so as to fill the pressure casting mold except for intermediate regions which are free of the sacrificial body, during pressure casting of the component, the sacrificial body is filled with the filling metal, and by means of the pressure casting tool, a shape which is at least close to the final shape of the component, comprising filled sacrificial body and the intermediate element (s) free of the sacrificial body, is cast. The component after casting is complete is heated to or above the reaction temperature in the region of the filled sacrificial body.

As a result of the pressure casting of the entire component simultaneously with the filling of the sacrificial body, i.e. the region of the sacrificial body and the intermediate elements free of the sacrificial body, in the same pressure casting tool, the subsequent mechanical joining of the individual regions of the component which has hitherto taken place can be omitted.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
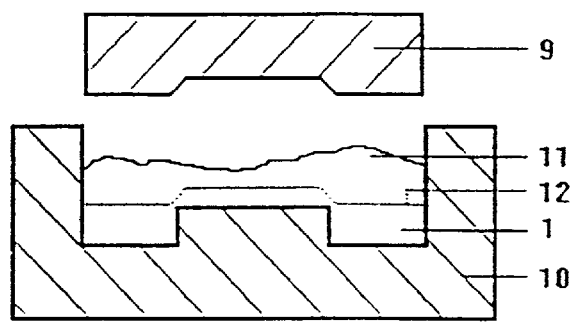
FIG. 1 is a schematic, cross-sectional view of a pressing die for the sacrificial body with introduced powder.

Before specifically discussing FIGS. 1 to 4, the production of a component will be described below in general terms for the example of a brake disc for motor vehicles.

Firstly, a sacrificial body is produced, advantageously by mixing $TiO_2$ with one or more boron (B)-containing and/or carbon-containing starting materials, in particular boride and/or carbide ceramics. The mix is heated and ignited at an exchange temperature of from 900° C. to 1900° C., preferably from 1100° C. to 1400° C., and below a temperature which leads to an autocatalytic reaction, in particular an explosion. At the exchange temperature, an exchange reaction between a starting material and the $TiO_2$ takes place to give the reaction products $TiB_x$ and/or $TiC_y$, where:

$0 \leq x \leq 2$ and $0 \leq y \leq 1$.

The dimensionally stable and porous sacrificial body is then produced from the reaction products, in particular by pressing.

In this production of the sacrificial body, an important advantage of a further embodiment of the process of the present invention is that avoiding the use of the very expensive TiC as the starting material for the sacrificial body results in low costs for both the raw materials and the process engineering. Thus, the invention has the advantage, for example in the production of a brake disc, of making the cost per brake disc in mass production close to that of cast discs.

The production of the sacrificial body will be described in more detail below.

The reactive starting materials in powder form are roughly mixed in a glass flask, with the starting materials being weighed out, in particular, in the previously calculated stoichiometric ratios. Advantageously, the mix is also made up with an excess of carbon and/or oxygen. The excess of carbon gives a better reaction of the $TiO_2$ while the excess of oxygen results in good oxidation of the aluminum to $Al_2O_3$.

A binder (polypropylene carbonate) dissolved in acetone is subsequently added to the powder mixture. This slip is thoroughly mixed on a rotary evaporator and dried at the same time. The dried material consists of large, hard agglomerates which in turn have to be comminuted in a centrifugal mill.

The mix obtained in this way is uniaxially pressed in a round pressing die to give a porous green body (die diameter 60 mm, 100 mm, 330 mm).

After pressing, the unheated green body having a ceramic matrix is subjected to heat treatment at an exchange temperature to produce the ceramic and porous sacrificial body.

Here, the heat treatment and the pressing can be interchanged. Thus, the heat treatment at the exchange temperature for the mix can be carried out first, and the heat-treated or ignited mix can be subsequently pressed and, if appropriate, scintered to produce the ceramic and porous sacrificial body.

It is known per se for fibers and/or felt and/or a woven fabric (hereinafter referred to summarily as fibers) to be added to the mix before pressing to form the green body or sacrificial body and mixed with the mix. Fibers which are useful are, for example, short fibers having a length of less than 15 mm and greater than 3 mm. The fibers are preferably based on $Al_2O_3$ and/or SiC and/or metal, in particular steel, and/or minerals.

The exchange temperature is from 9000° C. to 1900° C., preferably in a range from 1100° C. to 1400° C., but always below a temperature which leads to an autocatalytic reaction, in particular to an explosion, and using a temperature program whose ramps and hold times are appropriate to the reaction mechanisms. A graphite-heated cold-wall reactor under reduced pressure is usually used for heating.

With reference now to the drawings, the porous and ceramic sacrificial bodies 1 obtained in this way are subsequently laid into a pressure casting mold of a pressure casting tool in a defined position and also fixed in position relative to the pressure casting mold. The pressure casting tool is then closed and the pressure casting mold is filled with metal to form the entire brake disc. During filling of the pressure casting mold, the sacrificial body 1 is filled with a metal and/or an alloy containing the metal and, at the same time, the remaining intermediate regions 2 in which no sacrificial body 1 is present are filled to form the hub (intermediate element 3 seen in FIG. 3).

Figure 2:
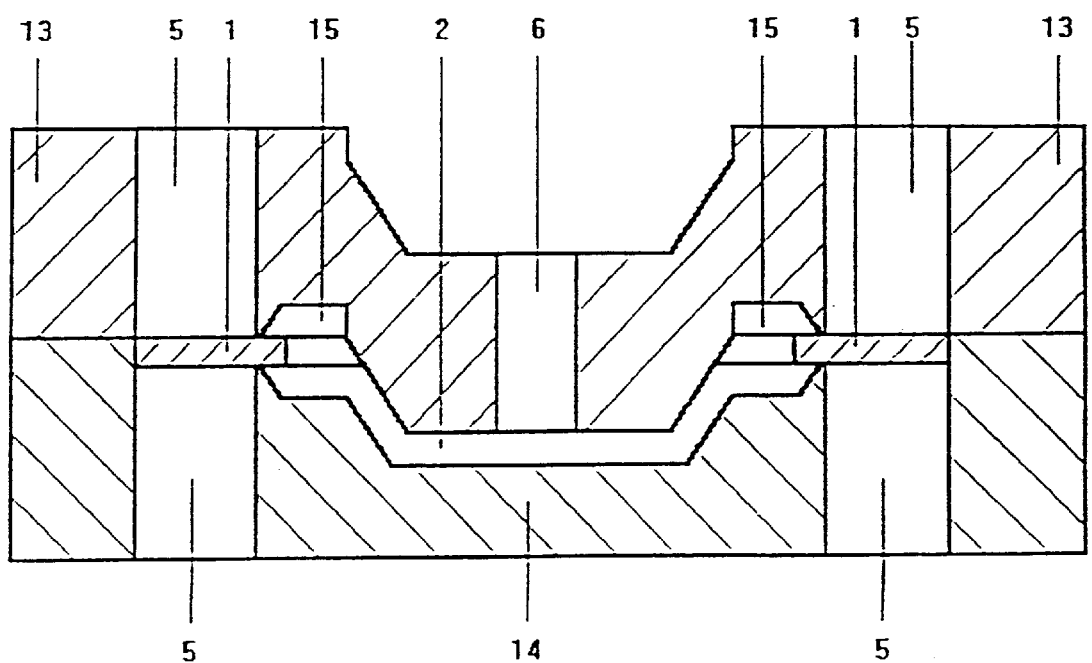
FIG. 2 is a schematic, cross-sectional view of a pressure casting tool with inserted sacrificial body.
Figure 4:
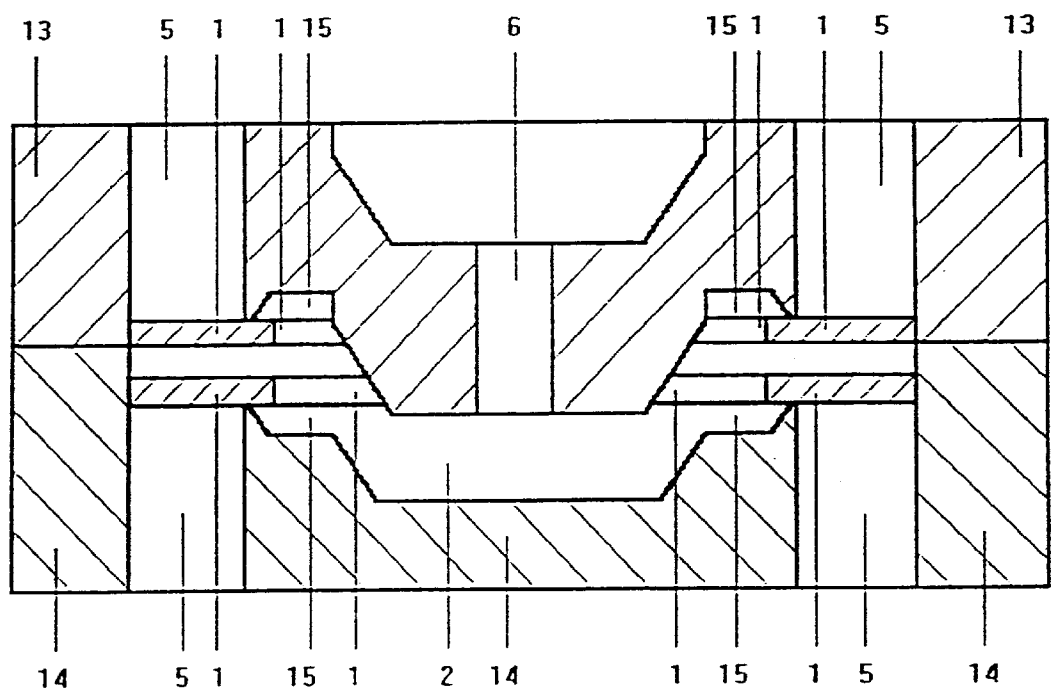
FIG. 4 is a schematic, cross-sectional view of a pressure casting tool with two inserted sacrificial bodies.

In particular, the regions of the sacrificial body 1 are provided with a material feed channel 5 as shown in FIGS. 2 and 4. In this way, the sacrificial body 1 can be filled separately from the remaining intermediate regions 2 which are supplied through separately controllable casting channels 6. With this structural configuration of a pressure casting tool, the pressure casting mold can, for example, be under a different pressure in the region of the sacrificial body 1 and/or even be filled with a different material than the remaining intermediate regions 2.

Consequently, a component to be produced can be matched in a favorable manner to its respective application. Thus, for example, the present invention makes it possible, in one working step, to fill the sacrificial body 1 with a first metal, e.g. a low-melting light metal such as aluminum, and to fill the intermediate regions 3 with a high-temperature-resistant further substance which joins to the first metal and/or the composite material.

The filling of at least the sacrificial body 1 is carried out at a filling temperature which is within a temperature range whose upper limit corresponds to a reaction temperature at which the filling metal (FMe), in particular aluminum and/or magnesium, reacts with a metal (CMe) of the sacrificial body 1 and whose lower limit is set by the softening point or the softening temperature of the filling metal (FMe). In particular, in the case of aluminum as filling metal (FMe), the filling temperature is below 1000° C., in particular below 900° C.

Figure 3:
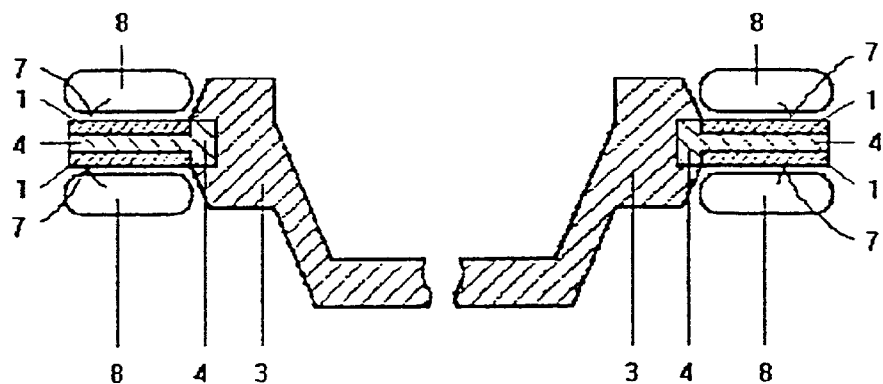
FIG. 3 is a schematic, cross-sectional view of a cast component with partially filled sacrificial body and induction heating.

After filling, the brake disc is heated in the region of the frictional surfaces 7 of the friction ring to be produced to or above the reaction temperature. Heating is thus carried out selectively in respect of the brake disc inductively or by friction. In inductance heating, use is made of an inductor 8 as seen in FIG. 3 while in friction heating the frictional surfaces of the brake disc are subjected, for example, to a process similar to braking in which the energy necessary for the reaction is supplied to the filled sacrificial body, at least in regions.

In order to prevent the metallic region of the cast brake disc being heated too strongly during heating to or above the reaction temperature, particularly when using aluminum for the hub (intermediate element 3) and as filling metal, the hub can be cooled, for example by cooling elements adjacent thereto, in particular cooling elements having a matching shape. Thereby, the hub remains at a temperature below a critical temperature. The cooling elements can be, in particular, in the form of heat exchangers. Another advantageous and likewise inexpensive alternative is for a liquid or gaseous coolant to flow through the interior of the cooling elements.

The inductive or frictional heating of the filled sacrificial body 1 advantageously allows the heat input to take place only at the surface or in a region close to the surface, so that a core 4 whose material has not reacted remains in the interior of the sacrificial body 1.

In particular, the phase composition of the friction ring perpendicular to the frictional surface can be set such that the proportion of the reacted ceramic-metal composite material decreases continuously towards the middle between the two frictional surfaces of the friction ring. This can go so far that the core in the middle remains unreacted and even after heating to the reaction temperature still contains aluminum, which has a positive effect on the damage tolerance and also on the dissipation of the heat generated during braking.

Furthermore, it is also useful to provide the frictional surfaces with a gradient in respect of the phase composition, so that the proportion of the ceramic-metal composite material decreases in the direction of the hub. As a result, the heat flow to the hub is improved because the thermal conductivity of the metal (here aluminum) is generally better than that of the ceramic-metal composite material.

The process steps for producing the brake disc having a friction ring which, at least in the region of the frictional surfaces 7 (FIG. 3), contains a ceramic-metal composite material are advantageously as follows:

(1) the starting materials for the material of the sacrificial body 1 are preferably provided in powder form, in particular weighed out, (2) if desired, fibers are added to the starting materials, (3) a binder is also added and mixed wet, (4) the mixture is subsequently dried and then milled (e.g. in a centrifugal mill) to form the mix, (5) the mix is pressed uniaxially and, before or after pressing, heat treated to form the sacrificial body 1, (6) the sacrificial body 1 is subsequently arranged in a pressure casting mold in a defined and fixed position, (7) the pressure casting mold and the sacrificial body 1 are filled with metal, and (8) the cast component is selectively heated to the reaction temperature in the region of the sacrificial body 1, with intermediate elements 3 of the component being cooled if desired, followed by final machining.

In the above described production of the ceramic-metal composite material, starting from the additional production of the material of the sacrificial body 1, two reactions, inter alia, occur in separate process steps. In the first step there is a solid-solid reaction (exchange reaction), and in the second step there is a solid-liquid reaction (final reaction). Both reactions correspond to a chemical redox reaction. Here, a ceramic compound reacts with a metal to form a new ceramic compound and liberate another metal.

The present invention is described below using aluminum as the exemplary filling metal. The present invention is not, however, restricted to the following examples, but can also be applied to other types of metal/ceramic which may be found, for example, in U.S. Pat. No. 5,214,011.

As already mentioned, the reaction of aluminum and titanium oxide will be described by way of example; this reaction is as follows:

$$4\ Al + 3\ TiO_2 \rightarrow 3\ Ti + 2\ Al_2O_3.$$

Before going into the precise details of the reaction procedure, it will be shown schematically for the sake of clarity.

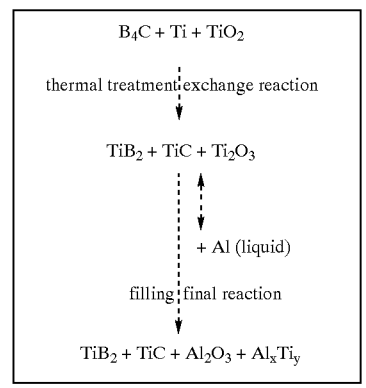

The particular advantage in this example is that a low-melting, inexpensive metal (aluminum) is reacted with a high-melting, expensive metal (Ti) A similar situation occurs with the ceramic constituents formed: here too, a low-value substance is transformed into a higher-value substance.

a) Exchange Reaction:

The first reaction step involves the above-described heat treatment of the mix or the green body; however, only the heat treatment of the green body will be discussed here. The pressed ceramic green body, which comprises a stoichiometric mixture of $B_4C/3$ Ti and 2 $TiO_2$, is subjected to a thermal treatment during which, essentially, the following reaction takes place:

$$B_4C + 3\ Ti + 2\ TiO_2 \rightarrow 2\ TiB_2 + TiC + Ti_2O_3 + 0.5\ O_2$$

Thus, an exchange reaction between $B_4C$ and Ti takes place, giving $TiB_2$ and TiC as reaction products. Although the $TiO_2$ is reduced to a lower oxidation state, it does not influence the above mentioned reaction, which is why its behavior can be described as "pseudo-inert".

The exchange reaction between $B_4C$ and Ti was selected because the reaction products $TiB_2$ and TiC yield good frictional properties. In the context of the present invention, the reaction can proceed in a controlled manner by way of a matched temperature program.

The composition and properties of the future composite can be manipulated in this process step. In the exchange reaction $B_4C/Ti$ there is a large negative volume change. That is, the porosity already present in any case in the porous body increases considerably; after heat treatment of the matrix it is usually from 40% to 55%. It is very important to set the porosity precisely in this process stage, because in the later filling of the sacrificial body 1 the porosity determines the amount of Al(metal) available for reaction and thus the final phase composition.

In order to set a particular porosity, on one hand, the composition of the green body can be varied; on the other hand, the reaction can be influenced by a suitable temperature program.

The variation of the composition of the green body will be described in more detail by way of example, inasmuch as this offers the opportunity of adding, fully or in part, the products of the exchange reaction $B_4C/Ti$, namely $TiB_2$ and (or) TiC, to the green body at the beginning. The batches used up to now have the following stoichiometry:

0.5 $B_4C$/1.5 Ti/$TiB_2$/0.5 TiC/2 $TiO_2$

2 $TiB_2$/TiC/2 $TiO_2$

3 TiC / 0.7 N / 0.3 2 $TiO_2$

After the first reaction step, the ceramic sacrificial body 1 has almost the same composition, only the porosity changes. This method advantageously allows the functional ceramic constituents to be precisely predetermined, and thus to set particular material properties, for example the coefficient of friction, can be set.

b) Final Reaction:

Before carrying out the final reaction, the porous and ceramic sacrificial body 1 is filled with the aluminum. For filling, for example, a sacrificial body 1 having a diameter of 100 mm and a thickness of 15 mm was placed in a pressure casting mold and infiltrated with Al which had a temperature around its melting point, in particular from 600 to 900° C. The infiltration time was 40 ms at a pressure of 800 bar. The melt used was 99.9%-pure aluminum and/or an Al alloy, in particular $Al/Si_2$.

Subsequently, the filled sacrificial body 1 was heated under reduced pressure to a temperature of above 1000° C. The aluminum melts, and Al and $Ti_2O_3$ react with one another above the reaction temperature. This reaction approximately obeys, depending on composition, the following equation:

$$4\ Al + Ti_2O_3 \rightarrow 2 AlTi + Al_2O_3.$$

During this reaction, the ceramic constituents $TiB_2$ and TiC, which represent the functional groups in the finished ceramic-metal composite material, remain inert. The Al and the $Ti_2O_3$ react in such a way that an at least substantially dense shaped body is present at the end.

As a further example, the reaction of aluminum and titanium oxide in the presence of elemental carbon, for example in the form of coal dust or graphite, will be described; the overall reaction is as follows:

$$2\ C + 3\ TiO_2 + 5\ Al \rightarrow 2\ Al_2O_3 + 2\ TiC + TiAl$$

Here too, the aluminum is reacted with the Ti. A similar situation occurs in the case of the ceramic constituents formed; likewise here, a low-value substance is transformed into a higher-value substance.

For the sake of clarity, this is shown schematically below.

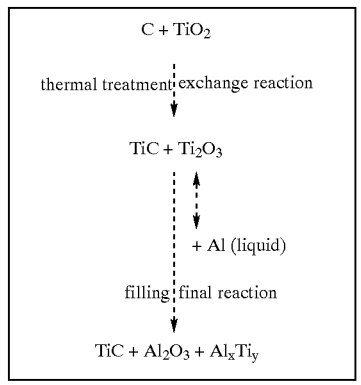

The first reaction step is the above-described heat treatment of the mix or the green body. In this example, only the heat treatment of the mix will be discussed. The mix, which comprises a stoichiometric mixture of C, Ti and $TiO_2$, is subjected to a thermal treatment in which, essentially, the following reaction takes place:

$$C + 2\ Ti + 3\ TiO_2 \rightarrow TiC + 2\ Ti_2O_3$$

The reaction products are thus $Ti_2O_3$ and TiC, from which the sacrificial body is pressed. During pressing, the sacrificial body 1 is given a shape close to that of the future semifinished part made of the ceramic-metal composite material.

In this process step, too, the composition and properties of the future composite can be advantageously manipulated.

The final reaction will not be discussed as it proceeds analogously to the previous example.

EXAMPLE 1

A powder mixture having the stoichiometric composition $B_4C/3\ Ti/2\ TiO_2$ is admixed with a binder (polypropylene carbonate) and pressed uniaxially to form a round disc. This disc is Subsequently heat treated in a graphite-heated cold-wall reactor under reduced pressure at from 1200° C. to 1400° C. for 30 minutes. The ceramic sacrificial body 1 formed in this way has the stoichiometric composition 2 $TiB_2/TiC/Ti_2O_3$ and has a porosity of 55%. The sacrificial body 1 is arranged in a pressure casting tool in a defined position and fixed in position relative to the pressure casting mold, and the pressure casting tool is closed. Al is injected into the pressure casting mold of the closed pressure casting tool, thus filling the sacrificial body 1 and the intermediate regions 2. The filled sacrificial body 1 is subsequently heated inductively, at least in regions, at about 1100° C., likewise under reduced pressure, for 1.5 hours. During heating, the intermediate elements 3 made of aluminum are cooled. The resulting ceramic-metal composite material consists of about 20% by volume of $TiB_2$, 10% of TiC, 15% of $Al_2O_3$, 45% of $Al_3Ti$ and 10% of Al.

In the further examples, only the sacrificial body 1 or the ceramic-metal composite material will be discussed, because the other steps are comparable and can be transferred thereto in a simple manner.

EXAMPLE 2

A powder mixture having the stoichiometric composition $2\ TiB_2/TiC/2\ TiO_2$ is processed and heat treated under the same conditions as in Example 1. The ceramic sacrificial body 1 likewise has the composition as in Example 1, but has a porosity of 45%. After the reaction with the previously introduced aluminum, the ceramic-metal composite material has a metallic proportion of about 52% of $Al_3Ti$ and 3% of Al, with the ceramic constituents remaining as in Example 1.

EXAMPLE 3

A powder mixture of $TiO_2/C$ is heat treated under a low $N_2$ partial pressure (<1 mbar) at 1800° C., forming a powder of the compound $TiC_xN_y$ (x, y depending on the $N_2$ partial pressure). The powder is mixed with $TiO_2$ in a ratio of 3:2 and processed as in Example 1. The ceramic phase of the resulting ceramic-metal composite material contains only $TiC_xN_y$ and Al; the metallic phase is identical to that in Example 1.

The motivation for this invention was the development of new brake discs. The properties which the brake disc has in the region of its frictional surfaces 7 allow the present invention to be used in corresponding applications in all fields where high temperatures and high wear occur. Such applications are, in particular, tribological systems, preferably structural components in jet engines and motors, in particular sliding bearings, cutting tool materials and particularly preferably brake discs. Furthermore, use as composite material for, in particular, bullet-proof armor is advantageous.

FIG. 1 shows a pressing die for a sacrificial body 1 with introduced powder. The pressing die has an upper part 9 and a lower part 10. To press the sacrificial body 1 or in the other case the green body, the appropriate powder 11 is introduced into the pressing die and the upper part 9 and the lower part 11 of the pressing die are moved relative to one another until the final position 12, which is shown by the dotted line, is reached and the sacrificial body 1 or green body has been pressed. The pressed body is taken from the pressing die and laid in a pressure casting mold of a pressure casting tool, as shown by way of example in FIGS. 2 and 4.

The pressure casting tool as shown in FIG. 2 provided for the pressure casting of brake discs has an upper part 13 and a lower part 14. The sacrificial body 1 is laid in the pressure casting mold and partly fills it. The upper part 13 and also the lower part 14 have a plurality of material feed channels 5 arranged in the region of the sacrificial body 1, so that the porous sacrificial body 1 can be filled quickly with the filling metal.

Because the casting of the hub (intermediate element 3) of the brake disc is easier than the filling of the sacrificial body 1, the corresponding casting channel 6 for this hub is arranged only in the upper die 13.

To obtain a good cast connection between the friction ring and the hub of the brake disc, the pressure casting mold has, in the transition region between the sacrificial body 1 and the future hub, a thickening 15, at least in regions, so that, in the transition region, the cast hub surrounds the inner edge of the annular sacrificial body 1 in a C-shape and adjoins the filled sacrificial body 1 directly and monolithically on both axial surfaces which, in regions, later form the frictional surfaces 7.

FIG. 3 shows the cast brake disc with filled sacrificial body 1. At the two axial surfaces of the filled sacrificial body 1, i.e. in the region of the future frictional surfaces 7, inductors 8 are arranged to heat the filled sacrificial body 1 along the two axial surfaces. Heating is carried out at or above the reaction temperature, although the two axial surfaces are heated to the reaction temperature only for about one third of the thickness of the sacrificial body 1. As a result, also only about one third of the thickness of the filled sacrificial body 1 is reacted on each side to form the ceramic-metal composite material, so that a core 4 of unreacted material remains.

FIG. 4 shows another pressure casting tool. In contrast to the pressure casting tool of FIG. 2, two sacrificial bodies 1 are laid into the pressure casting mold of the pressure casting tool in FIG. 4. When the pressure casting tool is closed, the sacrificial bodies 1 are aligned parallel to one another and have a spacing therebetween. This enables the intermediate space between the two annular sacrificial bodies 1 to be filled so as to form a core 4 with, for example, the material from which the hub, i.e. the intermediate element, is produced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component comprising: a first material including a ceramic-metal composite material including a ceramic phase and a metallic phase, which ceramic phase comprises $Al_2O_3$ and at least one compound selected from the group consisting of reaction products $TiB_x$, $TiC_y$ and TICN and which metallic phase comprises an intermetallic compound of Al and Ti, wherein the component has, in addition to the ceramic-metal composite material, a second material having a material composition which is different from the ceramic-metal composite first material and, simultaneously with forming the first material, forming at least one pressure-cast intermediate element in direct and monolithic contact with the ceramic-metal composite first material.

2. The component according to claim 1, wherein, in the region of the ceramic-metal composite material, a core is formed by the precursor material of the ceramic-metal composite material.

3. The component according to claim 1, wherein the phase composition of the component has a changing gradient along at least one spatial direction.

4. The component according to claim 1, wherein the component is capable of being stressed by friction, and the ceramic-metal composite material is arranged in a region of predetermined frictional surfaces.

5. The component according to claim 1, wherein the component is a structural component capable of use in a sliding bearing, a cutting tool or bullet-proof armor.

6. The component according to claim 1, wherein the component is configured as a brake disc for motor vehicles, the ceramic-metal composite material being arranged in the region of frictional surfaces and the intermediate element being a hub of the brake disc.

7. The component according to claim 1, wherein the ceramic-metal composite material contains at least one of short fibers, felt and woven fabric.

8. The component according to claim 7, wherein the fibers are based on at least one of $Al_2O_3$, SiC, steel, and minerals.

9. A method of using a component comprising a first material including a ceramic-metal composite material including a ceramic phase and a metallic phase, which ceramic phase comprises $Al_2O_3$ and at least one compound selected from the group consisting of reaction products $TiB_x$, $TiC_y$ and TiCN and which metallic phase comprises an intermetallic compound of Al and Ti, wherein the component has, in addition to the ceramic-metal composite material, a second material having a material composition which is different from the ceramic-metal composite first material, and simultaneously with forming the first material, forming at least one of a pressure-cast intermediate element in direct and monolithic contact with the ceramic-metal composite first material, including the step of:

using the component as part of a jet engine, a motor, a cutting tool or bullet-proof armor.

10. A method of using a component comprising a first material including a ceramic-metal composite material including a ceramic phase and a metallic phase, which ceramic phase comprises $Al_2O_3$ and at least one compound selected from the group consisting of reaction products $TiB_x$, $TiC_y$ and TiCN and which metallic phase comprises an intermetallic compound of Al and Ti, wherein the component has, in addition to the ceramic-metal composite material, a second material having a material composition which is different from the ceramic-metal composite first material and, simultaneously with forming the first material, forming at least one of a pressure-cast intermediate element in direct and monolithic contact with the ceramic-metal composite first material, including the steps of:

arranging the ceramic-metal composite first material in a region forming frictional surfaces in a brake disc assembly; and arranging the at least one intermediate element as a hub of the brake disc assembly.

11. A component comprising: a first material including a ceramic-metal composite material including a ceramic phase and a metallic phase, which ceramic phase comprises $Al_2O_3$ and at least one compound selected from the group consisting of reaction products $TiB_x$, $TiC_y$ and TiCN and which metallic phase comprises an intermetallic compound of Al and Ti, wherein the component has, in addition to the ceramic-metal composite material, a second material having a material composition which is different from the ceramic-metal composite first material and forming at least one pressure-cast intermediate element in direct and monolithic contact with the ceramic-metal composite first material;

wherein a phase composition of the component has a changing gradient along at least one spatial direction.

* * * * *